Patented July 12, 1949

UNITED STATES PATENT OFFICE 2,475,713

OIL BASE DRILLING FLUID AND MIXING OIL FOR THE SAME

George Miller, Arcadia, Calif., assignor to Oil Base, Inc., Los Angeles, Calif., a corporation of California No Drawing. Application January 10, 1947, Serial No. 721,486

6 Claims. (Cl. 252—8.5)

This invention relates to an oil base drilling fluid, and refers particularly to oil base drilling fluids of the type described in my previous United States Letters Patent Nos. 2,316,967, 2,316,968, and 2,356,776.

These oil base fluids employed for rotary drilling operations contain a gel-forming component which is asphalt, blown to certain specifications, and a weighting material such as ground limestone, barytes, or the like, for increasing the specific gravity of the fluid. The latter must have sufficient gel strength to suspend the weighting material and bit cuttings; insufficient gel strength permits the suspended material to settle out, resulting in dangerous reduction of hydrostatic head, stuck drill pipe, and loss of expensive rig time. For economical and practical reasons it is highly desirable to have a liquid gel-forming agent to supplement the blown asphalt when the oil base drilling fluid is first prepared, to offset the harmful effects of crude-oil contamination, to increase the gel strength and viscosity when the weight starts to drop, or when the drilling fluid is to be stored for an appreciable time. In addition, these drilling fluids must have the property of building a thin, impervious, tough wall on the face of the hole to plaster over the formations encountered in drilling, which will be impermeable to the liquid phase of the drilling fluid so as to prevent fluid loss to the formation, yet which may be readily deplastered to bring in the well when the oil base drilling fluid is displaced with crude oil.

It has been discovered that oil base drilling fluids, particularly those of the type described in my previous United States patents, above referred to, are substantially each affected, with respect to their properties, by the type of oil used therein. Unless the proper oil is employed, plastering and gel properties and other valuable attributes of the oil base drilling fluid will be badly affected. Nevertheless, previous to the present invention, little, if any, attention has been given to the characteristics of the oil to be used in oil base drilling fluids. Previous patents and literature dealing with this have merely referred to the oils to be used such general language as "mineral oil," or "fractions thereof," or "gas oil," or "a non-aqueous liquid," or "crude oil," or "kerosene," or "coal tar distillates," or "vegetable oils," or "animal oils," "ketones," "alcohols," etc., without, however, setting forth any precise specifications for such oils. In producing a satisfactory oil base drilling fluid, particularly one containing asphalt, oils which come within any of the above description may be totally unsatisfactory.

Previous to the present invention, it has been necessary for those engaged in making or using drilling fluids to try different oils in the hope of finding a suitable one without being guided by any knowledge of the particular characteristics of the oil to be sought.

It is the general object of the present invention to provide an oil base drilling fluid which employs as the oil base an oil of the type previously found unsuitable for producing oil base drilling fluids of satisfactory characteristics, the unsuitable characteristics of the oil being compensated for by the addition of suitable further ingredients.

More particularly, one of the objects of the present invention is to provide an oil base drilling fluid by the use of an oil which, because of its characteristics, normally heretofore has produced an oil base drilling fluid of inadequate gel strength and viscosity.

Another object of the present invention is to provide a drilling fluid of satisfactory characteristics through the use of an oil, which heretofore has had the characteristic of producing oil base drilling fluids of inadequate plastering properties having undesirable high fluid losses, by the addition of suitable ingredients for compensating for these characteristics of the oil.

The present invention is predicated upon the discovery of the specification which should be possessed by the oil used in an oil base drilling fluid and it is directed to the provision of steps by which oils which naturally are unsatisfactory for the purpose may be corrected in order that they may be employed by the manufacturer as satisfactory for a drilling fluid. By means of the present invention, the operator is able to produce a satisfactory oil base drilling fluid using oils from a wide variety of sources without resorting to elaborate tests to determine which of said oils is suitable. In fact the process of the present invention renders it possible to correct and use many oils in oil base drilling fluids which heretofore were required to be rejected as unsuitable.

I have discovered that oil coming within the following specifications will be always satisfactory for use in producing oil base drilling fluids containing asphalt of the types described in United States Patents 2,316,968 and 2,356,776. The specifications discovered are as follows:

| | |
|---|---|
| Gravity | 29° to 40° API |
| Flash point | 130° to 180° F. |
| Initial boiling point | 320° to 420° F. |
| Final boiling point | 500° to 650° F. |
| Acid number | 0.2 to 1.50 |
| Aniline point | 90° to 150° F. |
| Surface tension | Less than 24 dynes per cm. at 20° C. |

With regard, first, to the gravity of the oil to be employed, it is found that if the gravity of the oil is too low, the resulting viscosity of the mud will be too high at low temperatures, while if the gravity of the mixing oil is too high, the plastering property of the drilling fluid will be affected. To some extent certain of the foregoing specifications are interrelated. That is to say, a high gravity is ordinarily associated with a flash point which is below the specifications. Low flash point in turn is present in low boiling point ingredients and therefore is always associated with an excessively low boiling point oil.

I believe that one of these factors which substantially affect the plastering properties of an oil base drilling fluid in which asphalt is relied upon as the plastering ingredient, is the presence in the oil of ingredients having a solvent action on the asphalt. Low flash, low boiling point ingredients have ordinarily a higher solubility effect on asphalt than the higher boiling point ingredients which produce higher flash point.

Another criterion which segregates oils which produce satisfactory mud fluid from the standpoint of plastering properties is the surface tension of the oil employed. Oils which have a surface tension of less than 24 dynes per cm. at 20° C. do not have an excessive solvent power on the asphalt or asphaltenes in drilling fluid and therefore are satisfactory for that purpose, while those having a surface tension above about 24 dynes per cm. are unsatisfactory.

The gel strength of the drilling fluid is affected by the naphthenic or aliphatic acid content, by the boiling point and the aniline point, as well as the surface tension of the mixing oil. If the mixing oil does not have an aniline point, initial boiling point, and surface tension within the specifications stated, the oil base drilling fluid produced from said mixing oil will have poor plastering properties and the ingredients of the oil base drilling fluid will filter into the formations encountered, and, moreover, the deplastering properties of the oil base drilling fluid will be seriously impaired.

In addition to the selection of the proper mixing oil, the most desirable oil base drilling fluids also require the utilization of the correct asphalt. As explained in my United States Patent No. 2,316,968, the properties of the asphalt produced vary during the process of air-blowing the asphalt and the asphaltene content tends to increase and the particle size of the asphalt increases while the oily constituents and the asphaltic resins decrease in quantity. There is a certain ratio of these components which produces an asphalt wherein the plastering and gel properties are at a maximum and thus allow the asphalt to be made up into a drilling fluid particularly for use in wells having a high bottom hole temperature. The correct specifications for the air-blown asphalt, are, as more fully stated in said Patent 2,316,968, an asphalt made from the correct stock and having a melting point of from 260° to 310° F. and a penetration of from 14 to 6 at 25° C.

If such an asphalt is used in making an oil base drilling fluid, and a mixing oil which tends to highly dissolve the asphalt or the asphaltene content in the asphalt is used, then the plastering properties of the drilling fluid will be seriously impaired. The asphaltene content in asphalts is only partially soluble in saturated hydrocarbons having specifications within the range stated, but are soluble to a greater extent, or completely, in aromatic hydrocarbons.

The present invention therefore includes the discovery that where the acid number of the oil used in making oil base drilling fluids of the type herein referred to is too low to come within the aforesaid specifications, the result will be that the gel strength of the drilling fluid and the viscosity of the drilling fluid will be too low to be fully satisfactory for use. These defects may be overcome by the addition of the correct quantity of naphthenic acid.

The present invention therefore also includes the discovery that where an oil is to be used for making an oil base drilling fluid which because its aniline point is too low to be within said specifications, with the result that it will tend to produce a drilling fluid having insufficient plastering properties and a resulting high fluid loss, these characteristics can be compensated for by the addition to the drilling fluid as produced of a suitable quantity of oil having a high aniline point; and, conversely, where the aniline point of the oil to be used is too high so as to adversely affect the plastering quality and fluid loss of drilling fluids, these characteristics may be overcome by mixing therewith an oil of low aniline point.

Where a mixing oil is encountered which has an acid number too low to come within the recommended specifications, the addition of naphthenic acid in quantities sufficient to bring the acid number within the specifications will produce a satisfactory mixing oil (provided the other characteristics stated are present). Thus, for example, a mixing oil obtained from Duncan, Oklahoma, having a gravity of 31.5, acid number 0.05, and an aniline point of 86 failed to meet the above specification in being slightly below the lower value for the aniline point and very substantially below the acid number recommended; and when used to make an oil base drilling fluid the drilling fluid possessed insufficient gel strength. By the addition to the mixing oil of .2% of naphthenic acid, the acid number was raised to 0.50 with a marked improvement in gel strength. Such a mixing oil with its acid number corrected as indicated is substantially satisfactory, although it would be improved by blending with an oil of higher aniline point to raise slightly its aniline point.

In making an oil base drilling fluid using the proportions of ingredients described in my aforesaid United States Letters Patent or, more particularly, in the proportions of 50% by weight of mixing oil, 33% by weight of ground calcium carbonate, 4% by weight of calcium hydroxide and 13% by weight of blown asphalt, or any reasonable approximation to these proportions, a drilling fluid results, and the problem where the acid number of the mixing oil is too low is to obtain sufficient gel strength and viscosity for rendering the oil base fluid less fluid. The addition of naphthenic acid as described has the effect of rendering the oil base drilling fluid more viscous or of greater gel strength rather than rendering the same more fluid.

A stove oil obtained from Tulsa, Oklahoma, having a gravity of 39.2, an acid number of 0.10, and an aniline point of 147, when tested for the production of a drilling fluid, produced a drilling fluid defective in plastering properties. By the addition of 2.9% of naphthenic acid, the acid number was raised to above .50 with marked improvement in the plastering properties and improvement in the gel strength of the mud produced therefrom.

Similarly, a Diesel oil from Cleveland, Ohio, having a gravity of 39.5, an acid number of 0.03, and an aniline point of 163, when used in forming a drilling fluid, produced a drilling fluid very unsatisfactory in plastering properties and having unsatisfactory gel strength. By blending said oil with another oil high in naphthenic acid, or having a high acid number and a lower aniline point and gravity, there was produced an oil having a gravity of 35.3, an acid number of 0.87, and an aniline point of 140.4; the oil then produced, when used in forming a drilling fluid, produced a drilling fluid having excellent plastering properties and gel strength.

In addition to the use of naphthenic acid for correcting the acid number, some other acids may be employed as an equivalent of and regarded herein as naphthenic acid, although the normal naphthenic acid in most cases is much more effective. Other acids employed in place of naphthenic acids may, for example, be aliphatic acids, such as are obtained from petroleum, cresylic acids, mixtures of petroleum sulphonates and aliphatic acids, which would affect acids of the type such as calcium sulfono naphthionic abietinic acid, and acids admixed with various higher alcohols and hydrocarbons.

In producing a drilling fluid as herein described, particularly in connection with the use of the special asphalt recommended, the addition of acids such as naphthenic acid, aliphatic acid, etc., where the mixing oil has a low acid number, has the effect of increasing the viscosity of the produced mud.

In producing drilling fluids using the mixing oils having the specifications herein recited, one may use the same materials and proportions as indicated in my earlier patent referred to, or, for example, the drilling fluid may contain 50% by weight of the mixing oil, 33% by weight of ground calcium carbonate as a weighting material, 4% of calcium hydroxide as a settling inhibitor, with 13% blown asphalt having melting points and penetrations within the ranges previously referred to.

The invention is of the scope set forth in the appended claims.

I claim:

1. An oil base drilling fluid of the type employing blown asphalt as a plastering agent, a weight material and a petroleum mixing oil in proportions to produce a fluid oil in which the mixing oil is within the gravity of 29° to 40° API, flash 130° to 180° F., initial boiling point 320° to 420° F., final boiling point 500° to 650° F., aniline point 90° to 150° F., surface tension less than 24 dynes per cm. at 20° C. and an acid number below 0.2, the drilling fluid being further characterized by the addition of sufficient naphthenic acid to bring the acid number between 0.2 and 1.5.

2. An oil base drilling fluid of the type employing asphalt as a plastering agent, a weight material, calcium hydroxide and a petroleum mixing oil characterized by the fact that the mixing oil has as specifications of gravity 29° to 40° API, a flash point of 130° to 180° F., an initial boiling point of 320° to 420° F., a final boiling point of 500° to 650° F., an aniline point of from 90° to 150° F. and a surface tension of less than 24 dynes per cm. at 20° C., the mixing oil being characterized by the fact that its acid number is below 0.2, the drilling fluid being further characterized by the fact that sufficient naphthenic acid is added thereto to bring the acid number of the mixing oil to within the range of 0.2 to 1.5.

3. An oil base drilling fluid of the type employing blown asphalt as a plastering agent, a weight material and a petroleum mixing oil characterized by the fact that the mixing oil is within the gravity of 29° to 40° API, a flash point of 130° to 180° F., an initial boiling point of 320° to 420° F., a final boiling point of 500° to 650° F., and a surface tension of less than 24 dynes per cm. at 20° C., has an acid number below 0.2 and an aniline point below 90° F., and further characterized by the addition of sufficient naphthenic acid and oil of high aniline point to bring the acid number within the range of 0.2 to 1.5 and the aniline point within the range of 90° to 150° F.

4. An oil base drilling fluid of the type employing blown asphalt as a plastering agent, a weight material and a mixing oil, in which the mixing oil is within the gravity of 29° to 40° API, a flash point of 130° to 180° F., an initial boiling point of 320° to 420° F., a final boiling point of 500° to 650° F., and a surface tension of less than 24 dynes per cm. at 20° C., has an acid number below 0.2 and an aniline point of above 150° F., the drilling fluid containing sufficient naphthenic acid to bring the acid number of the mixing oil to within the range of 0.2 to 1.5, and sufficient added aromatic containing material to reduce the aniline point to within the range of 90° to 150° F.

5. An oil base drilling fluid of the type employing petroleum mixing oil as a base, blown asphalt as a plastering agent and a weight material in proportions to give a fluid mix, the drilling fluid being characterized by the fact that the mixing oil is within the gravity of 29° to 40° API, a flash point of 130° to 180° F., an initial boiling point of 320° to 420° F., a final boiling point of 500° to 650° F., and a surface tension of less than 24 dynes per cm. at 20° C., has an aniline point above 150° F. and sufficient added aromatic containing material to reduce the aniline point to within the range of 90° to 150° F.

6. An oil base drilling fluid of the type employing petroleum mixing oil as a base, blown asphalt as a plastering agent and a weight material characterized by the fact that the mixing oil is within the gravity of 29° to 40° API, a flash point of 130° to 180° F., an initial boiling point of 320° to 420° F., a final boiling point of 500° to 650° F., and a surface tension of less than 24 dynes per cm. at 20° C., has an aniline point below 90° F. and the addition of sufficient high aniline point oil to raise the aniline point to within the range of 90° to 150° F.

GEORGE MILLER.

REFERENCES CITED

The following references are of record in the file of this patent:

UNITED STATES PATENTS

| Number | Name | Date |
|---|---|---|
| 2,217,927 | Campen | Oct. 15, 1940 |
| 2,265,962 | Bent et al. | Dec. 9, 1941 |
| 2,316,967 | Miller | Apr. 20, 1943 |
| 2,316,968 | Miller | Apr. 20, 1943 |
| 2,356,776 | Miller | Aug. 29, 1944 |
| 2,363,499 | Campbell | Nov. 28, 1944 |

OTHER REFERENCES

Alexander, "Oil base drilling muds often boost production," article in The Oil Weekly, September 4, 1944, pages 35, 38, and 40.